United States Patent [19]

Park

[11] Patent Number: 6,046,783
[45] Date of Patent: *Apr. 4, 2000

[54] VIBRATION PREVENTING DEVICE FOR USE IN A TELEVISION

[75] Inventor: Sang Deuck Park, Seoul, Rep. of Korea

[73] Assignee: Daewoo Electronics Co., Ltd., Rep. of Korea

[ * ] Notice: This patent is subject to a terminal disclaimer.

[21] Appl. No.: 09/217,604

[22] Filed: Dec. 22, 1998

[30] Foreign Application Priority Data

| Apr. 30, 1998 | [KR] | Rep. of Korea | 98-15650 |
| Apr. 30, 1998 | [KR] | Rep. of Korea | 98-15651 |
| Apr. 30, 1998 | [KR] | Rep. of Korea | 98-15652 |

[51] Int. Cl.[7] .............................. H04N 5/64; A47B 81/06
[52] U.S. Cl. ........................... 348/836; 348/825; 312/7.2
[58] Field of Search .................................. 312/7.2, 223.1, 312/223.2; 348/825, 836; 248/917, 918, 919, 920, 921, 922, 923; 361/681, 682, 683

[56] References Cited

U.S. PATENT DOCUMENTS

| 2,929,667 | 3/1960 | Jackson | 348/825 X |
| 3,104,282 | 9/1963 | Horn et al. | 361/682 X |
| 3,703,323 | 11/1972 | Gallas et al. | 312/7.2 |
| 4,853,790 | 8/1989 | Dickie | 348/836 X |
| 4,873,578 | 10/1989 | Tognoni et al. | 348/836 |
| 5,033,802 | 7/1991 | Fairbanks | 312/7.2 |
| 5,041,944 | 8/1991 | Campisi | 361/682 |
| 5,209,445 | 5/1993 | Bergetz | 312/7.2 X |
| 5,363,150 | 11/1994 | Kojima | 312/7.2 X |
| 5,575,545 | 11/1996 | Wang | 312/7.2 |
| 5,583,582 | 12/1996 | Higuchi et al. | 348/836 |
| 5,863,106 | 1/1999 | Beak | 312/7.2 |

FOREIGN PATENT DOCUMENTS

| 851612 | 9/1970 | Canada | 312/7.2 |
| 969704 | 7/1958 | Germany | 312/7.2 |
| 2303992 | 3/1997 | United Kingdom . | |
| 2307136 | 5/1997 | United Kingdom . | |

Primary Examiner—Peter R. Brown
Assistant Examiner—James O. Hansen
Attorney, Agent, or Firm—Pennie & Edmonds LLP

[57] ABSTRACT

A television has a housing front portion, the housing front portion has a "standard thickness" meaning the thickness thereof is constant, with a speaker thereon. The television has a vibration preventing device having a vibration preventing structure integrally formed on the housing front portion for diminishing a vibration of the television caused by the speaker by controlling a natural frequency of the housing front portion and reinforcing the housing front portion.

8 Claims, 21 Drawing Sheets

6,046,783

VIBRATION PREVENTING DEVICE FOR USE IN A TELEVISION

FIELD OF THE INVENTION

The present invention relates to a television; and, more particularly, to a vibration preventing device for use in a television, the device being designed to prevent the television from vibrating and to reduce interferences caused thereby by controlling a natural frequency and a mode of vibration of the television.

BACKGROUND OF THE INVENTION

There is illustrated in FIG. 1, a schematic view of the way in which a speaker is mounted in a conventional television. As shown in FIG. 1, the television has a housing front portion 1 for accommodating a speaker grill 2. A speaker 5 having a diaphragm 4 is mounted at the rear of the speaker grill 2 through a speaker frame 3. A plurality of buttons 6 are mounted on the housing front portion 1.

The frame 3 supports the speaker 5 and transfers vibrations of the speaker 5 caused by the vibration of a moving coil and a diaphragm 4 therein to the housing front portion 1 to thereby cause a resonance phenomenon. Due to this resonance, vibrations and noises occur mainly at the housing front portion 1.

FIG. 2A is a graph of accelerations measured at a connecting spot between the speaker and the housing front portion of the television and FIG. 2B shows a graph of displacements measured at the connecting spot between the speaker and the housing front portion of the television. As shown in FIGS. 2A and 2B, the connecting spot most severely vibrates when the frequency of the speaker 5 is 168 Hz.

FIG. 3 represents a graph of sound pressures measured at an outer spot of the television. The largest sound pressure is observed when the frequency of the speaker 5 is 216 Hz. The sound pressure is generated not by the vibration of the speaker 5 but by the vibration of the television.

Consequently, the resonance frequencies of the speaker 5 and the housing front portion 1 are 168 Hz and 216 Hz, respectively. The frequency of the housing front portion 1 is larger at the face and bottom panels of the housing front portion 1, and the vibration of the buttons 6 are caused by the face and the bottom panels vibrating. Finally, noises are generated as a result of the interferences between the vibration of the buttons 6 and the vibration of the housing front portion.

SUMMARY OF THE INVENTION

It is, therefore, a primary object of the present invention to provide a vibration preventing device for use in a television, the device being designed to prevent the television from vibrating and to reduce interferences caused thereby by controlling a natural frequency and a mode of vibration of the television.

The above and other objects of the present invention are accomplished by providing a television having a housing front portion, the housing front portion being provided with a "standard thickness" meaning the thickness thereof is constant, with a speaker thereon, said television comprising; a vibration preventing device having a vibration preventing structure integrally formed on the housing front portion for diminishing a vibration of the television caused by the speaker by controlling a natural frequency of the housing front portion and reinforcing the housing front portion.

BRIEF DESCRIPTION OF THE DRAWINGS

The above and other objects and features of the instant invention will become apparent from the following description of preferred embodiment taken in conjunction with the accompanying drawings, in which.

DETAILED DESCRIPTION OF THE PREFERRED EMBODIMENT

Preferred embodiments of the present invention are described by referring to the FIGS. 4 to 18C.

Figure 1:
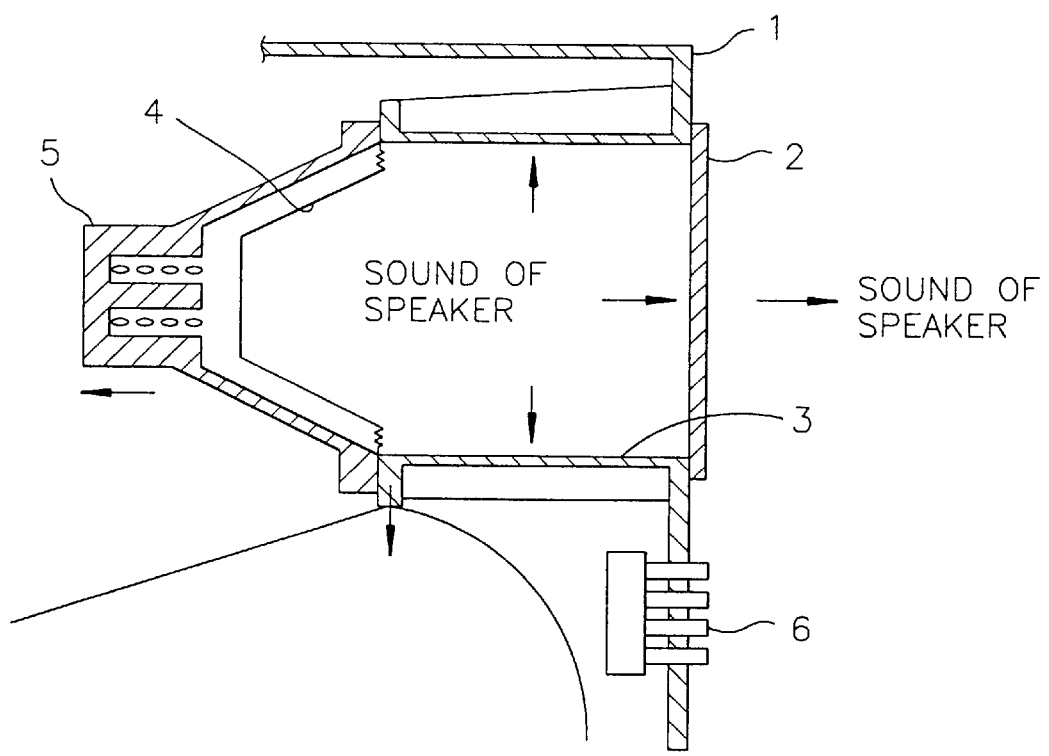
FIG. 1 illustrates a schematic view of the way in which a speaker is mounted in a conventional television.
Figure 2A:
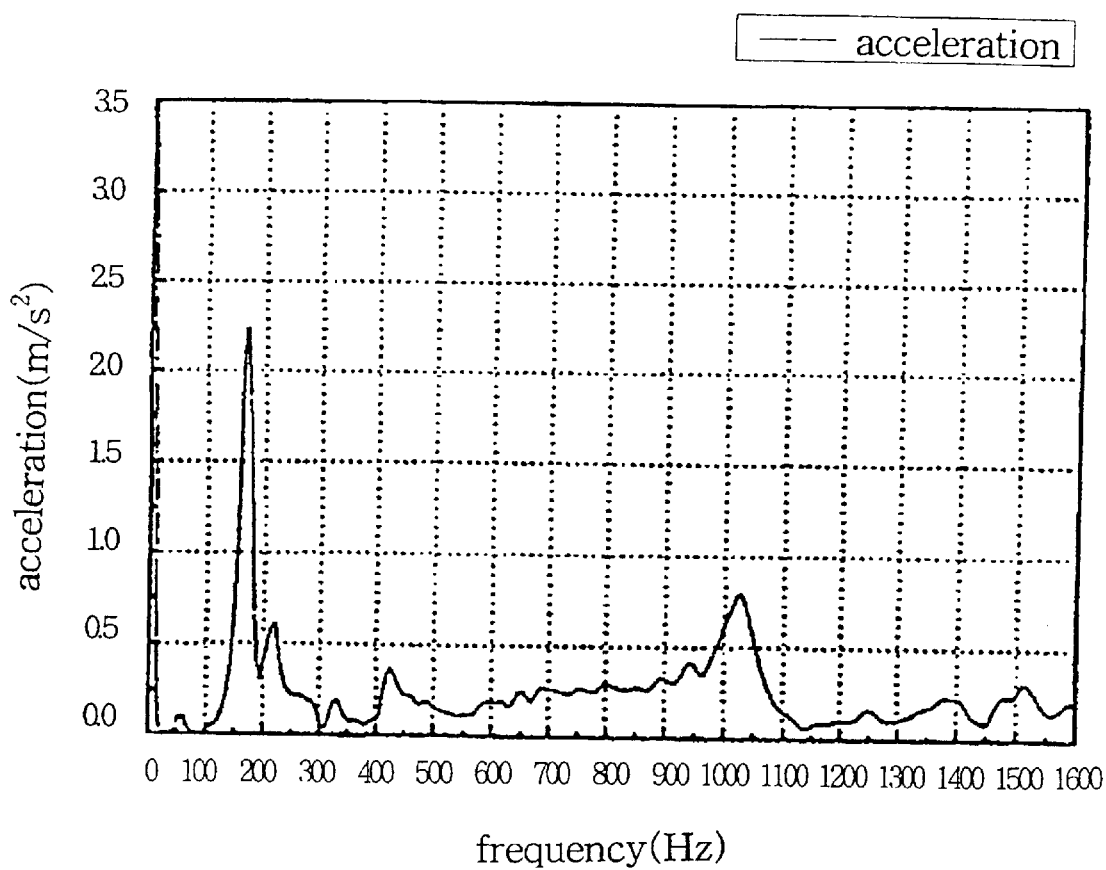
FIG. 2A is a graph of accelerations measured at a connecting spot between the speaker and a housing front portion of the television.
Figure 2B:
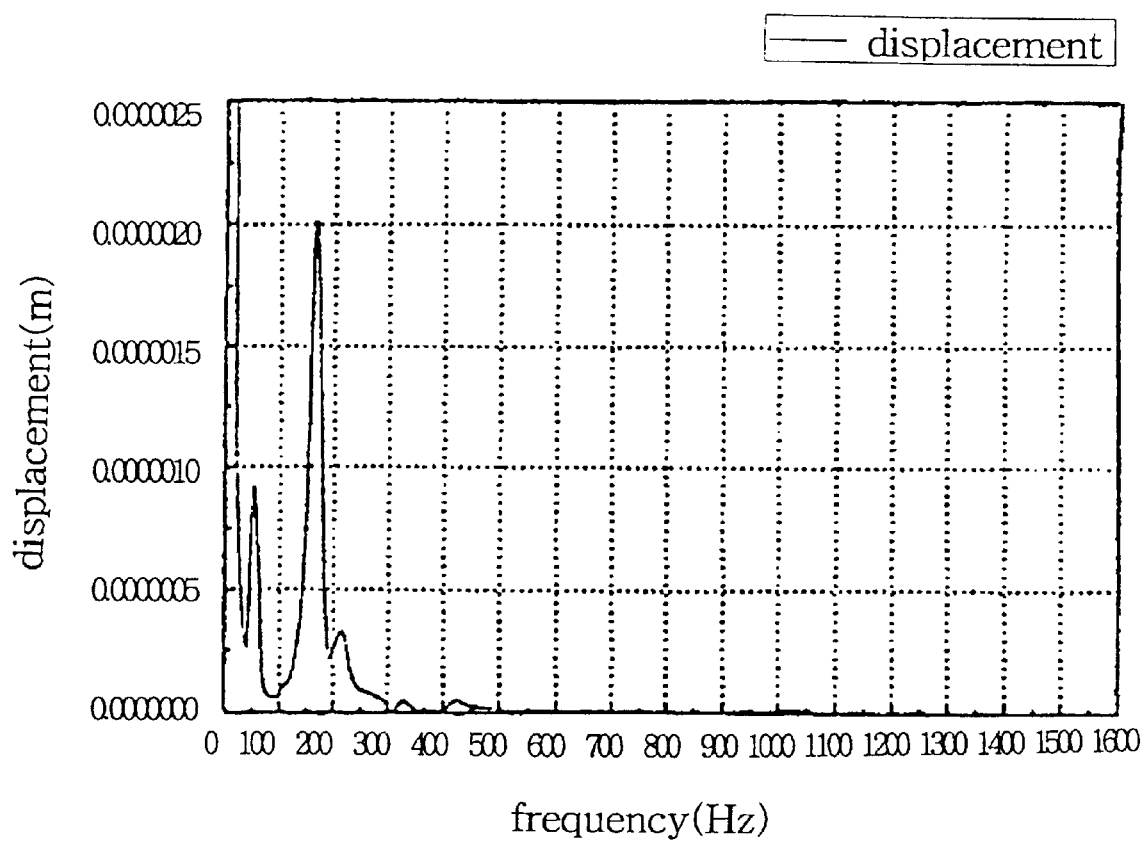
FIG. 2B shows a graph of displacements measured at the connecting spot between the speaker and the housing front portion of the television.
Figure 3:
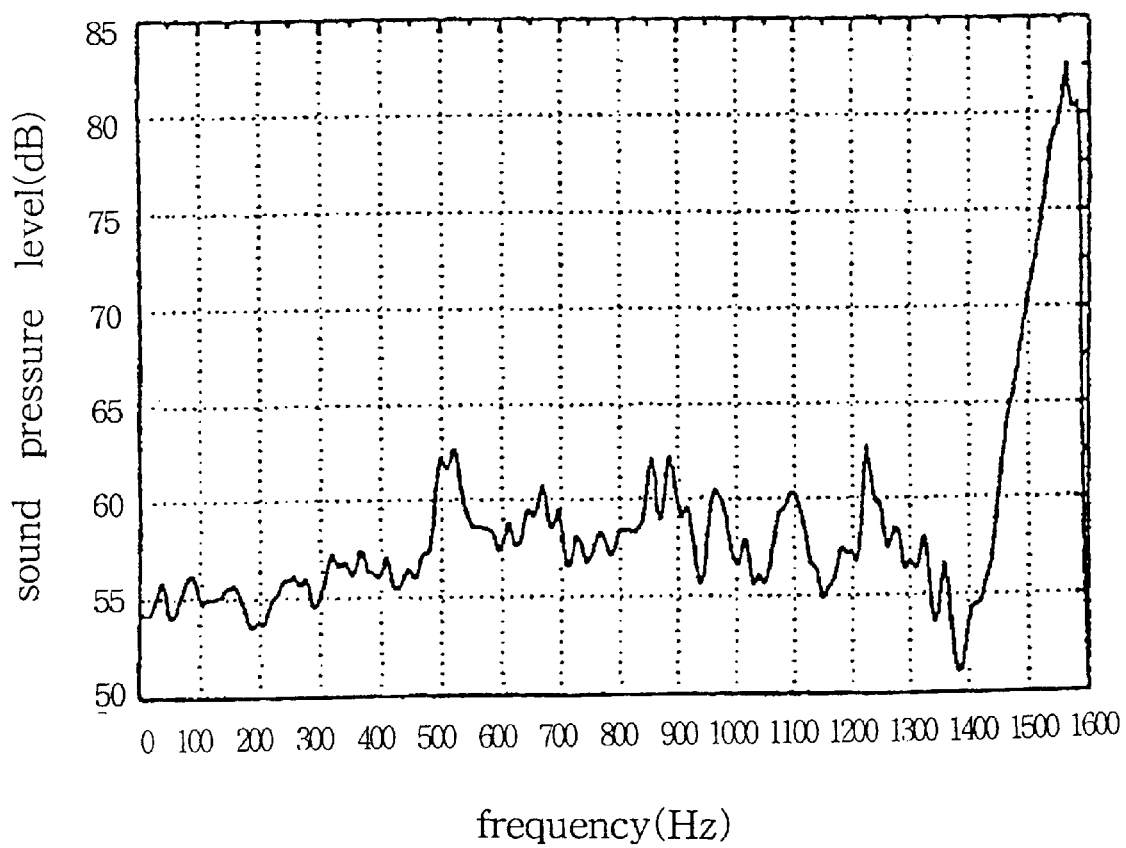
FIG. 3 represents a graph of sound pressures measured at an outer spot of the television.
Figure 4:
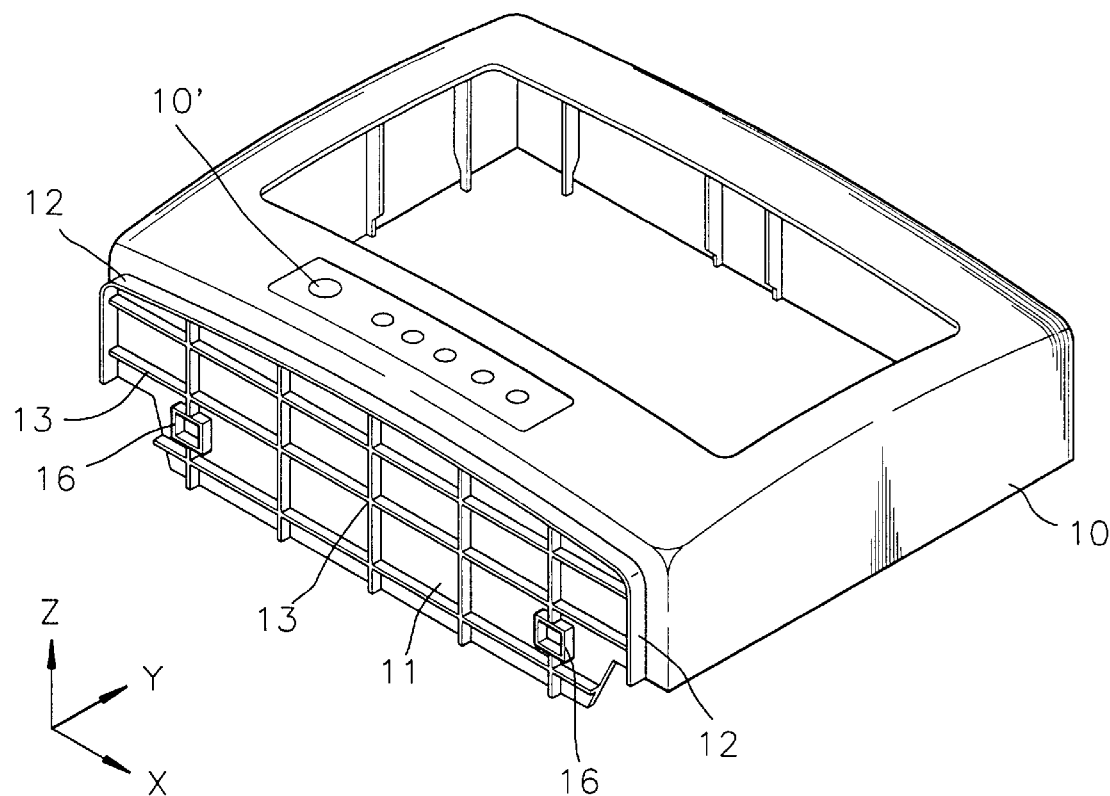
FIGS. 4 to 5 depict a schematic view of a reinforcing rib and a reinforcing part formed on bottom of the housing front portion of a television in accordance with a preferred embodiments of the present invention.
Figure 5:
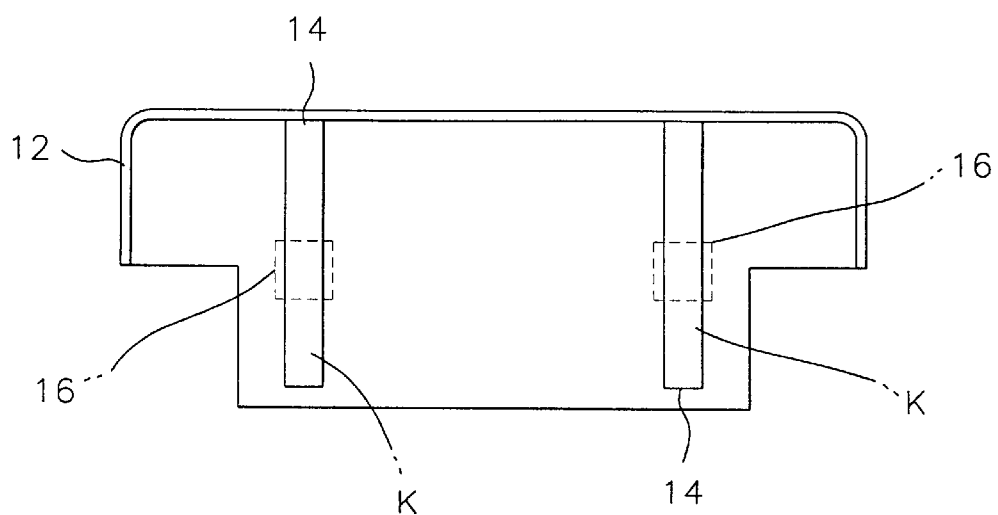

Firstly, the first preferred embodiment of the present invention is disclosed in FIGS. 4 to 8. The FIGS. 4 to 5 depict a schematic view of a reinforcing rib and a reinforcing part formed at bottom of the housing front portion of a television.

Thickness of the parts forming a case of the television is of "standard thickness". That is, all of the parts have the same thickness.

According to the first preferred embodiment of the present invention, the thickness of a bottom panel 11 and a face 12 located in front of the bottom panel 11 are 1.2 to 1.5 times the thickness of the standard thickness. Further, the thickness of a reinforcing rib 13 protruding from the bottom panel 11 is 1.1 to 1.2 times the thickness of the standard thickness to thereby suppress a resonance phenomenon. The reinforcing rib 13 is cross-shaped. A pair of rails 14 for mounting a printed circuit board thereon protrude from the bottom panel 11 of the housing front portion 10. Reinforcing parts 15 contacting a surface P on which the television sits are formed under the rails 14 beneath the bottom panel 11.

The reinforcing part 15 is a supporting bracket 16 having a rectangular shape to allow the television to easily sit on the surface P. Especially, the rails 14 are located on a upside of a center K of the supporting bracket 16 to thereby suppress a vibratory interference between the rails 14 and the printed circuit board due to the sound pressure. The shapes of the supporting bracket 16 can be a circle, a diamond, a triangle and etc.

Figure 6:
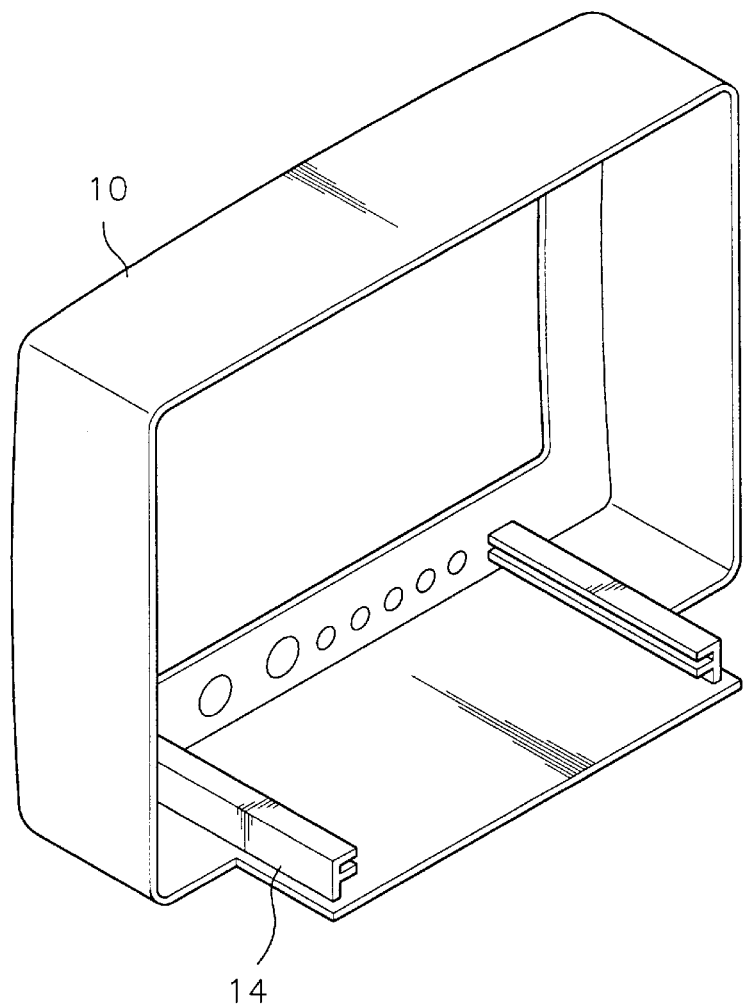
FIGS. 6 to 7 offer a schematic view of the reinforcing part formed on the bottom of the housing front portion of a television in accordance with a first preferred embodiment of the present invention.
Figure 7:
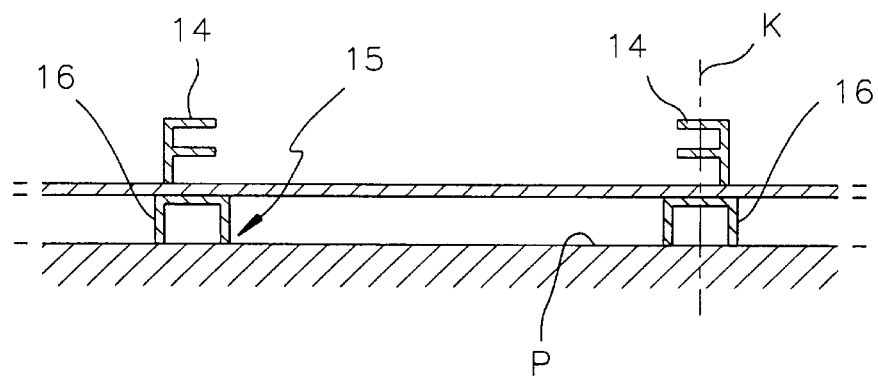
Figure 8:
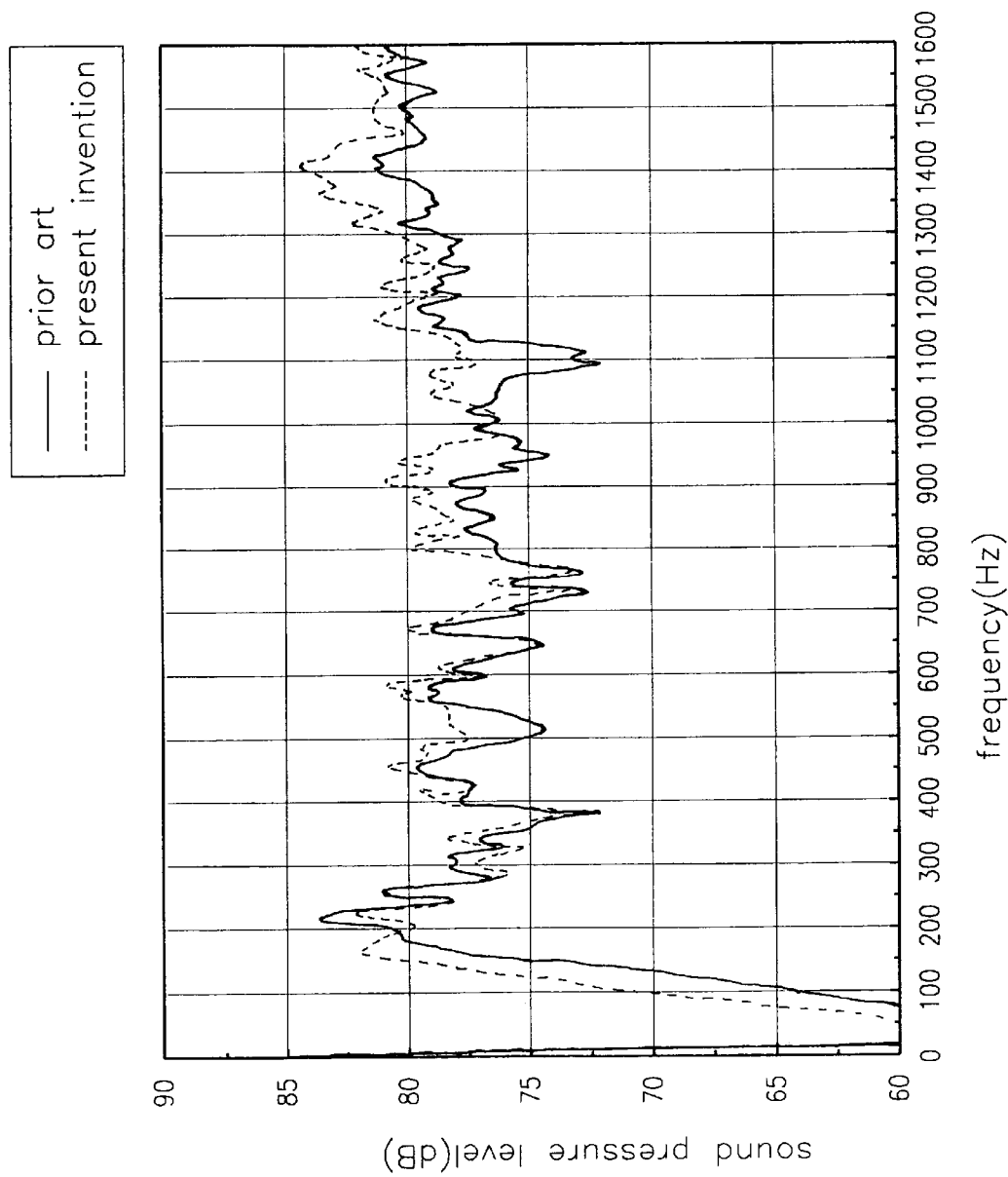
FIG. 8 presents a graph of sound pressures measured at an outer spot of the television in accordance with the first preferred embodiment of the present invention.

FIGS. 6 to 7 offer a schematic view of the reinforcing part 15 formed on the bottom of the housing front portion of the television in accordance with the first preferred embodiment of the present invention for contacting the surface on which the television sits and FIG. 8 presents a graph of sound pressures measured at an outer spot of the television in accordance with the first preferred embodiment of the present invention.

In the vibration preventing device for use in the television in accordance with the first preferred embodiment of the present invention, the thicknesses of the bottom panel 11 and the face 12 located in front of the bottom panel 11 are 1.2 to 1.5 times the thickness of the standard thickness, etc., 2.7 mm, which, in turn, increases the stiffness of the housing front portion 10, resulting in the vibration of the housing front portion 10 being suppressed.

It is also preferable that the resonance frequency of the structure is quite different from 168 Hz, the resonance frequency of the speaker. Since the thickness of the bottom panel 11 cannot be increased too much, the thickness of the reinforcing rib 13 is increased instead. The reinforcing rib 13 is separated from the face 12 in order to prevent the vibration from travelling in the direction of Y axis to the button area 10'. It is preferable that the gap between the rib 13 and the face 12 is about 1 to 5 mm.

To be more specific, the supporting brackets 16 are formed under the rails 14 and toward the back from each center of the rails 14 of the housing front portion 10. The graph shown in FIG. 8 is a result of sound pressures measured at a spot 30 cm from the face of the housing front portion of the television in accordance with the first preferred embodiment of the present invention by changing frequencies of the speaker. As shown in FIG. 8, the prior art housing front portion is outlined by real line and the present inventional housing front portion 10 is outlined by dotted line. Peak value of resonance frequency of the present invention is lower than that of the prior art.

Accordingly, using the vibration preventing device for use in the television in accordance with the first preferred embodiment of the present invention, the vibration of the housing front portion of the present invention can be diminished strikingly by thickening the bottom panel and face of the housing front portion 10, reinforcing the housing front portion 10 by forming a cross shaped reinforcing rib 13, allowing a supporting bracket 16 integrally formed beneath the housing front portion 10 to contact with the surface on which the television sits.

Figure 9:
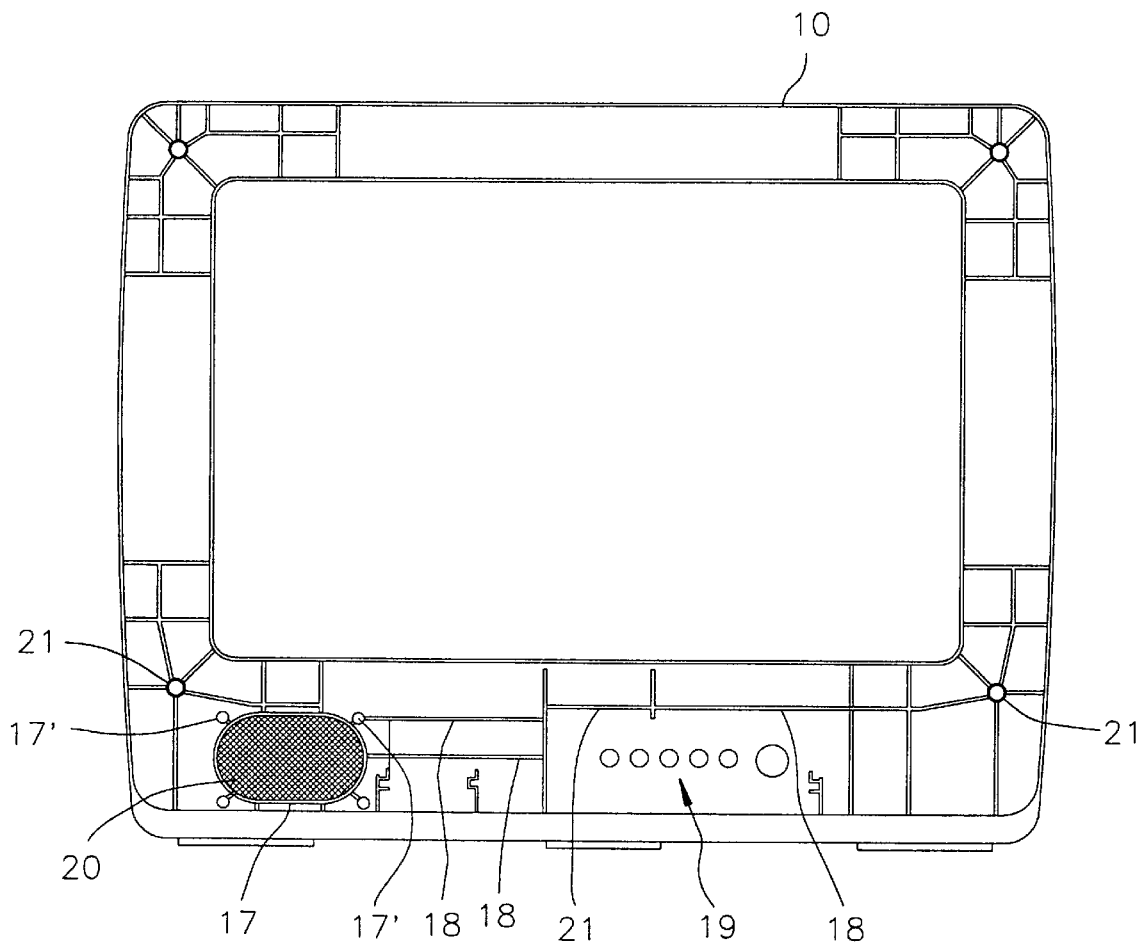
FIGS. 9 to 10 provide a rear view of a reinforcing protrusion formed on a speaker frame of the housing front portion in accordance with a second preferred embodiment of the present invention.
Figure 10:
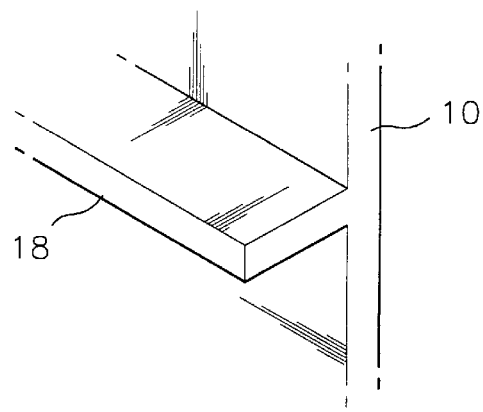
Figure 11:
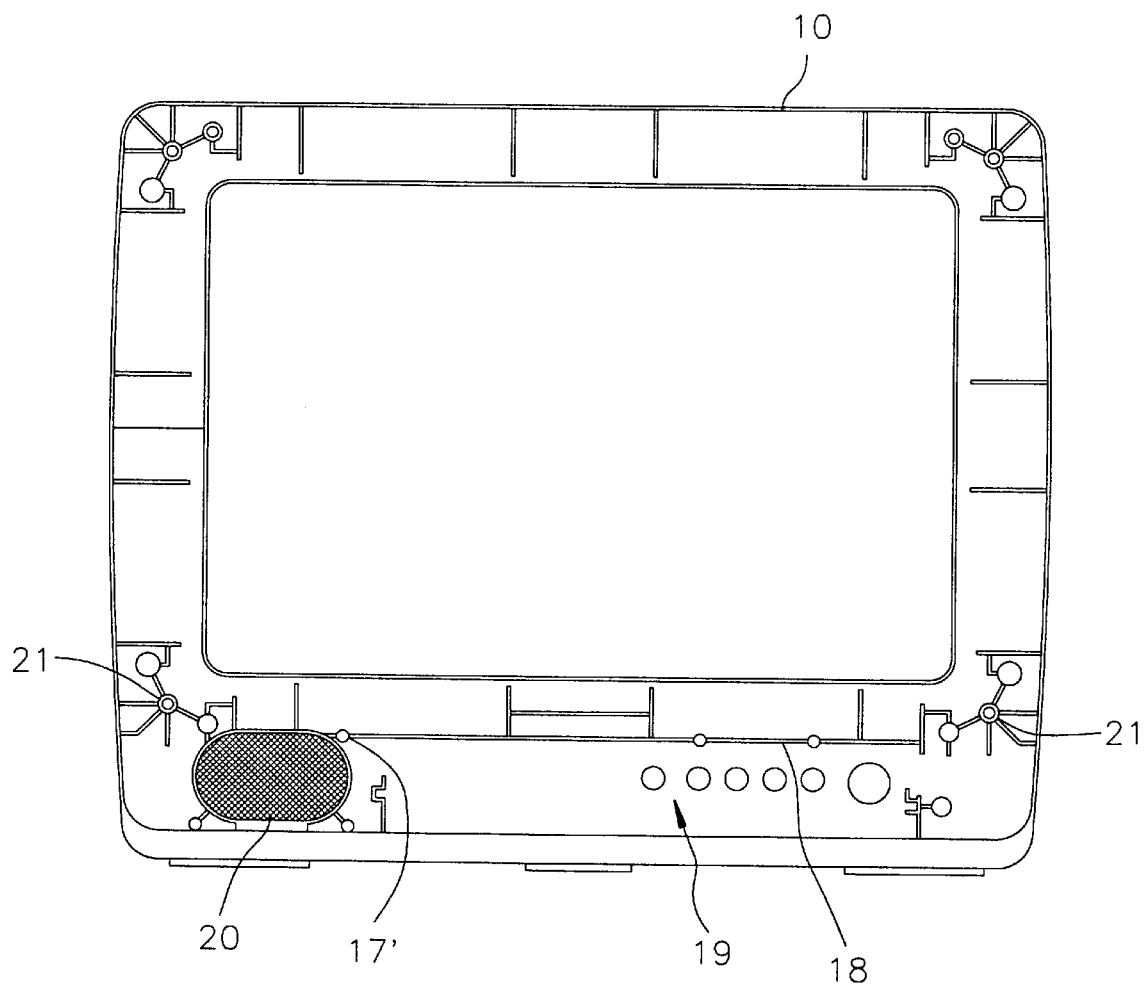
FIG. 11 gives a rear view of a reinforcing protrusion formed on a boss above the speaker frame in accordance with the second preferred embodiment of the present invention.

There is disclosed in FIGS. 9 to 13, a second preferred embodiment of the present invention with. In describing the second embodiment, FIGS. 1 to 5 are referred from time to time. FIGS. 9 to 10 provide a rear view of a reinforcing protrusion formed on a speaker frame of the housing front portion, where the speaker in accordance with the second preferred embodiment of the present invention is mounted and FIG. 11 gives a rear view of a reinforcing protrusion formed on a boss above the speaker frame in accordance with the second preferred embodiment of the present invention.

The second preferred embodiment of the present invention has the same components as the first embodiment of the present invention. Further, the second embodiment has a reinforcing protrusion 18 horizontally formed on both sides of a speaker frame 17 where the speaker 20 of the housing front portion 10 is mounted. The reinforcing protrusion 18 fully extends across the housing front portion 10, to thereby suppress the vibration of the housing front portion 10 in the direction of Z axis due to the sound pressure of the speaker 20.

When the reinforcing protrusion 18 cannot be formed on the center of the speaker frame 17, the reinforcing protrusion 18 is formed on a boss 17' located above the frame 17. The thickness of the reinforcing protrusion 18 is 1.3 to 1.5 times the thickness of the standard thickness. When the reinforcing protrusion 18 is thinner than the range specified above, the vibration of the housing front portion 10 in the direction of the Z axis becomes more pronounced. Further, when the reinforcing protrusion 18 is thicker than the range, the housing front panel 10 is shrinked.

The height of the reinforcing protrusion 18 is 1.5 to 5 times longer than the standard thickness. When the height of the reinforcing protrusion 18 is longer than 5 times the standard thickness, the reinforcing protrusion 18 may interfere with the circuit parts mounted in the television and a plurality of problems may occur when forming or ejecting the housing front portion 10 from a metal mold(not shown).

Figure 12:
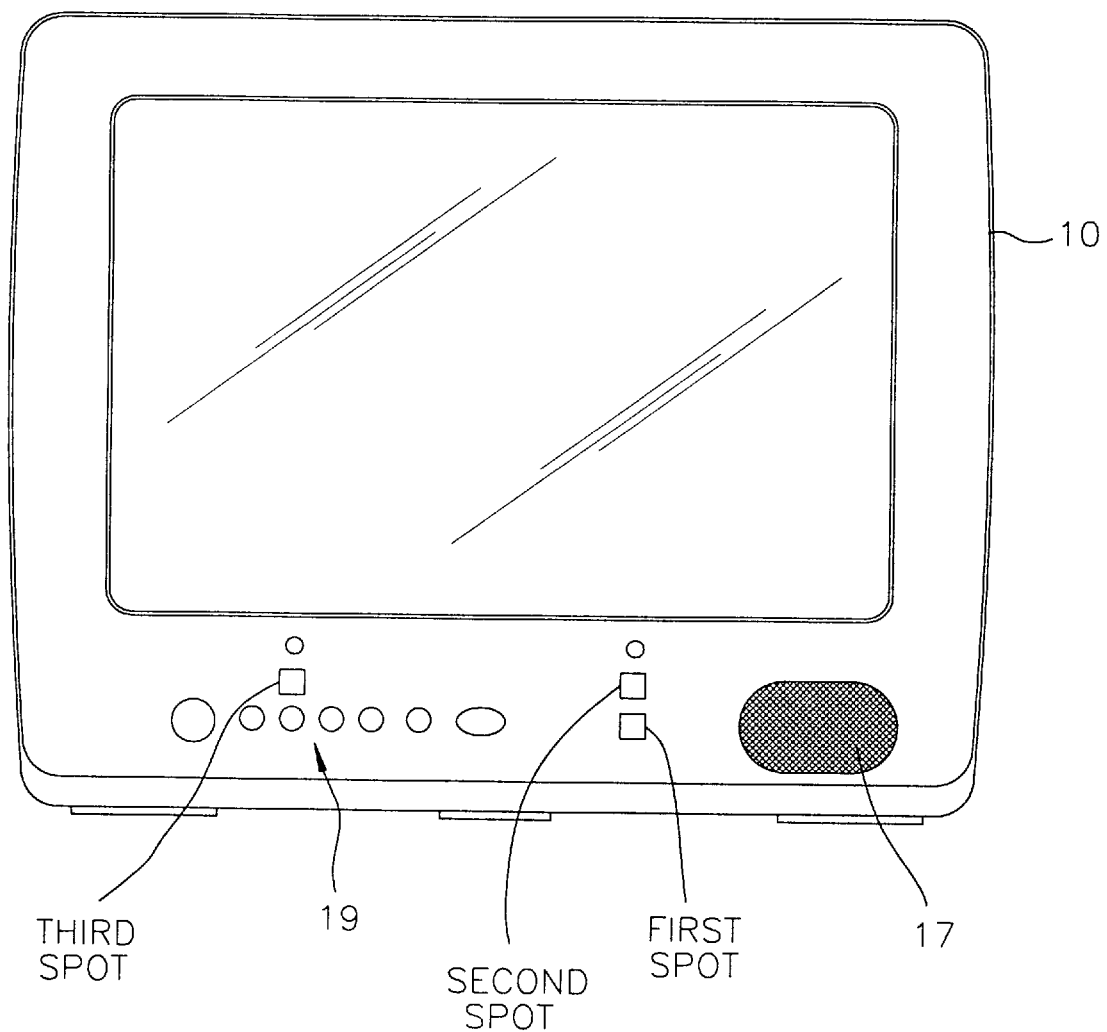
FIG. 12 sets forth a schematic view of the television showing measuring spots for measuring accelerations in a direction of Z axis in accordance with the second preferred embodiment of the present invention.

FIG. 12 sets forth a schematic view of the television showing measuring spots at which accelerations in a direction of Z axis are increased, after the reinforcing protrusion has been added to the speaker frame in accordance with the second preferred embodiment of the present invention.

Figure 13A:
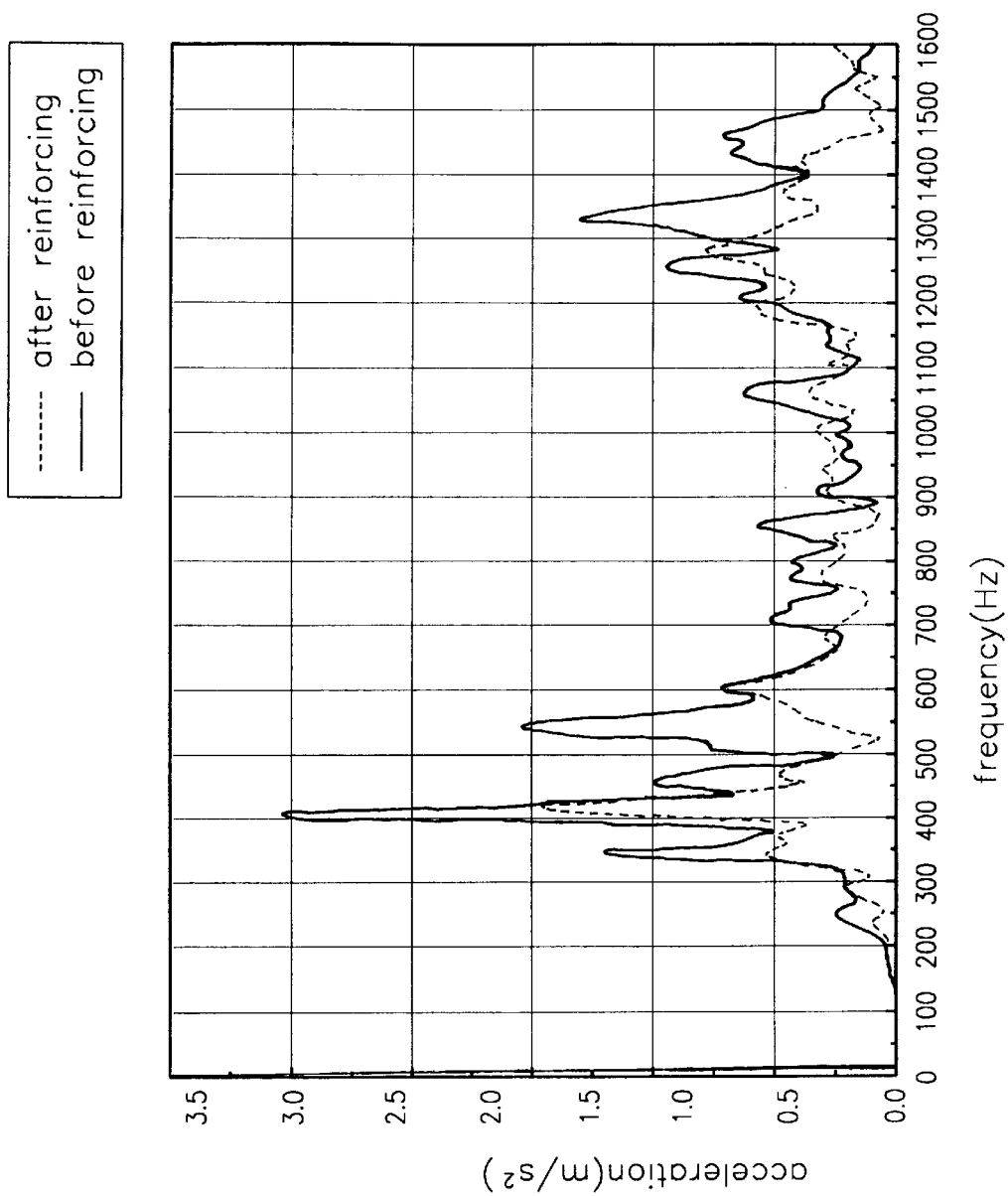
FIG. 13A describes a graph of accelerations in the direction of Z axis measured at a first spot on the face of the housing front portion after the speaker frame has been reinforced with the reinforcing protrusion in accordance with the second preferred embodiment of the present invention.
Figure 13B:
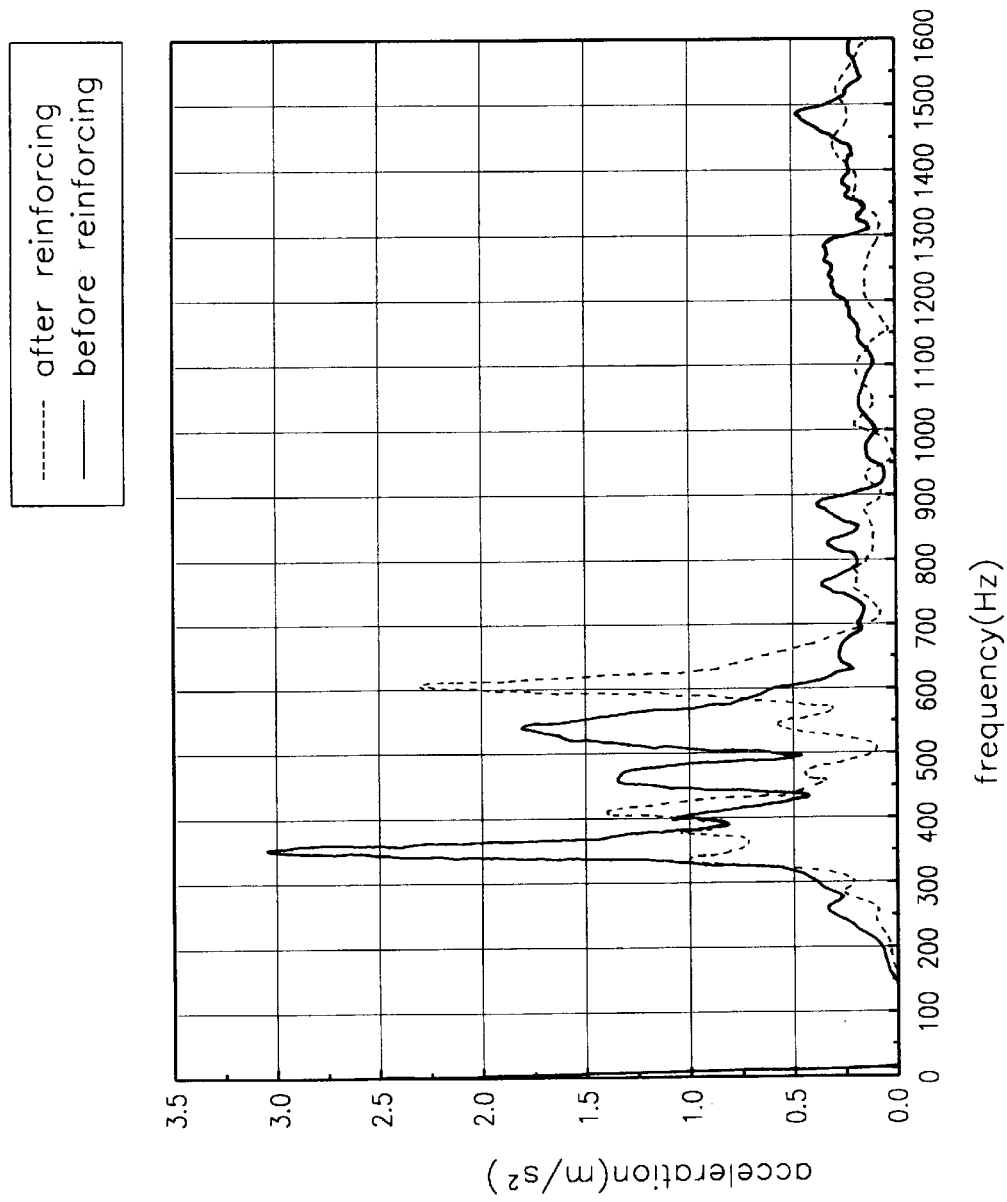
FIG. 13B shows a graph of accelerations in the direction of Z axis measured at a second spot on the face of the housing front portion after the speaker frame has been reinforced with the reinforcing protrusion in accordance with the second preferred embodiment of the present invention.
Figure 13C:
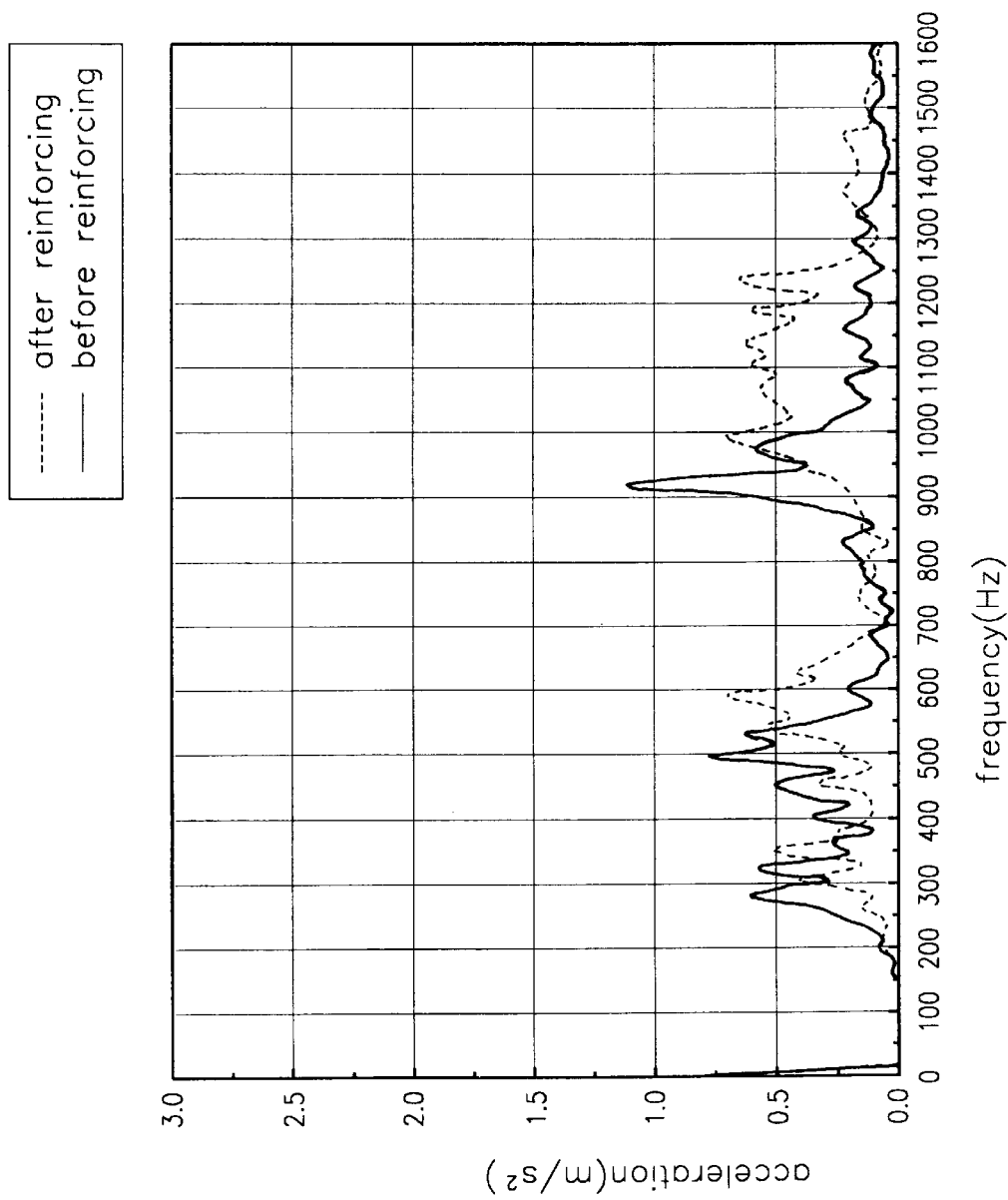
FIG. 13C represents a graph of accelerations in the direction of Z axis measured at a third spot on the face of the housing front portion after the speaker frame has been reinforced with the reinforcing protrusion in accordance with the second preferred embodiment of the present invention.

FIG. 13A describes a graph of accelerations in the direction of Z axis measured at a first spot on the face of the housing front portion after the speaker frame has been reinforced with the reinforcing protrusion in accordance with the second preferred embodiment of the present invention, FIG. 13B shows a graph of accelerations in the direction of Z axis measured at a second spot on the face of the housing front portion after the speaker frame has been reinforced with the reinforcing protrusion in accordance with the second preferred embodiment of the present invention, and FIG. 13C represents a graph of accelerations in the direction of Z axis measured at a third spot on the face of the housing front portion after the speaker frame has been reinforced with the reinforcing protrusion in accordance with the second preferred embodiment of the present invention. These graphs show that an acceleration in the direction of Z axis is prominently diminished when the speaker frame 17 is reinforced horizontally with the reinforcing protrusion 18.

Accordingly, using the vibration preventing device for use in the television in accordance with the second preferred embodiment of the present invention, the vibration of the housing front portion in the direction of Z axis can be diminished substantially by reinforcing the speaker frame 17 of the housing front portion horizontally.

Figure 14:
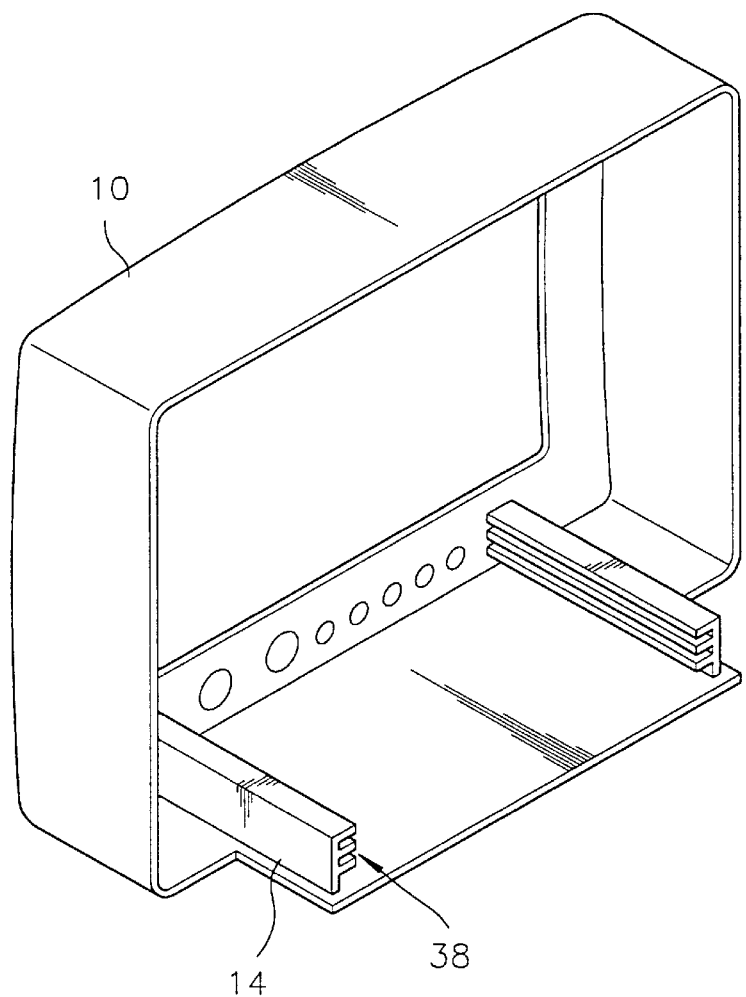
FIGS. 14 to 15 illustrate a schematic view of a supporting part of a rail for mounting a printed circuit board, mounted below a housing front portion in accordance with a third preferred embodiment of the present invention.
Figure 15:
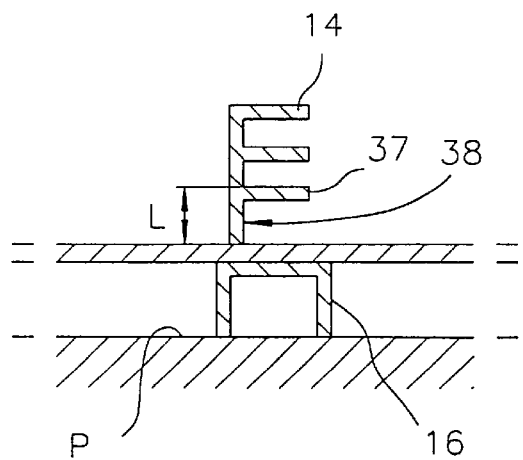

There is disclosed in FIGS. 14 to 18, a third preferred embodiment of the present invention with. In describing the third embodiment, FIGS. 1 to 5 are referred from time to time. FIGS. 14 to 15 illustrate a schematic view of a supporting part of a rail for mounting a printed circuit board, mounted below a housing front portion in accordance with the third preferred embodiment of the present invention.

The third preferred embodiment of the present invention has the same components as the first embodiment of the present invention. Further, the third embodiment has reinforcing supports 38 having ribs 37 stretched along the direction of the rails 14, to thereby diminish a vibration in a direction of X axis due to the sound pressure of the speaker. The ribs 37 are formed under the rails 14 where the printed circuit board is mounted.

Thickness of reinforcing support 38 is 1.3 to 1.5 times the thickness of the standard thickness. When the reinforcing support 38 is thinner than the range specified above, the vibration of the rail becomes more pronounced. Further, when the reinforcing support 38 is thicker than the range, the rails 14 are probable to be deformed, or the forming of the ribs 37 can be difficult. It is preferable that the ribs 37 are near to the rails 14.

Figure 16:
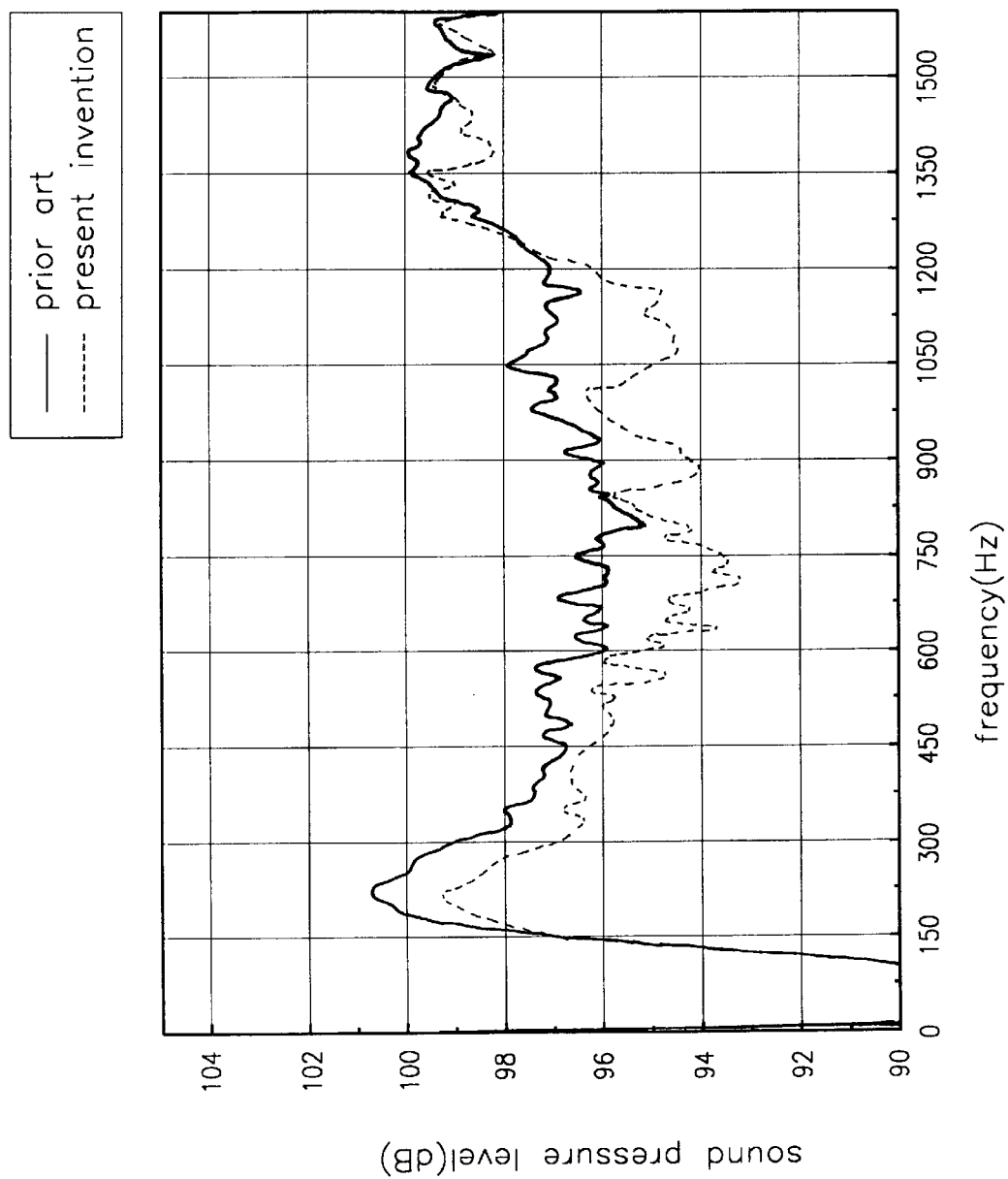
FIG. 16 depicts a graph of sound pressures measured at an outer spot of the television in accordance with the third preferred embodiment of the present invention.

FIG. 16 depicts a graph of sound pressures measured at an outer spot of the television in accordance with the third preferred embodiment of the present invention. As shown in FIG. 16, the sound pressures are measured at a spot 30 cm from the face of the housing front portion. The prior art housing front portion is outlined by real line and the present inventional housing front portion 10 is outlined by dotted line. Peak value of resonance frequency of the present invention is lower than that of the prior art.

Figure 17A:
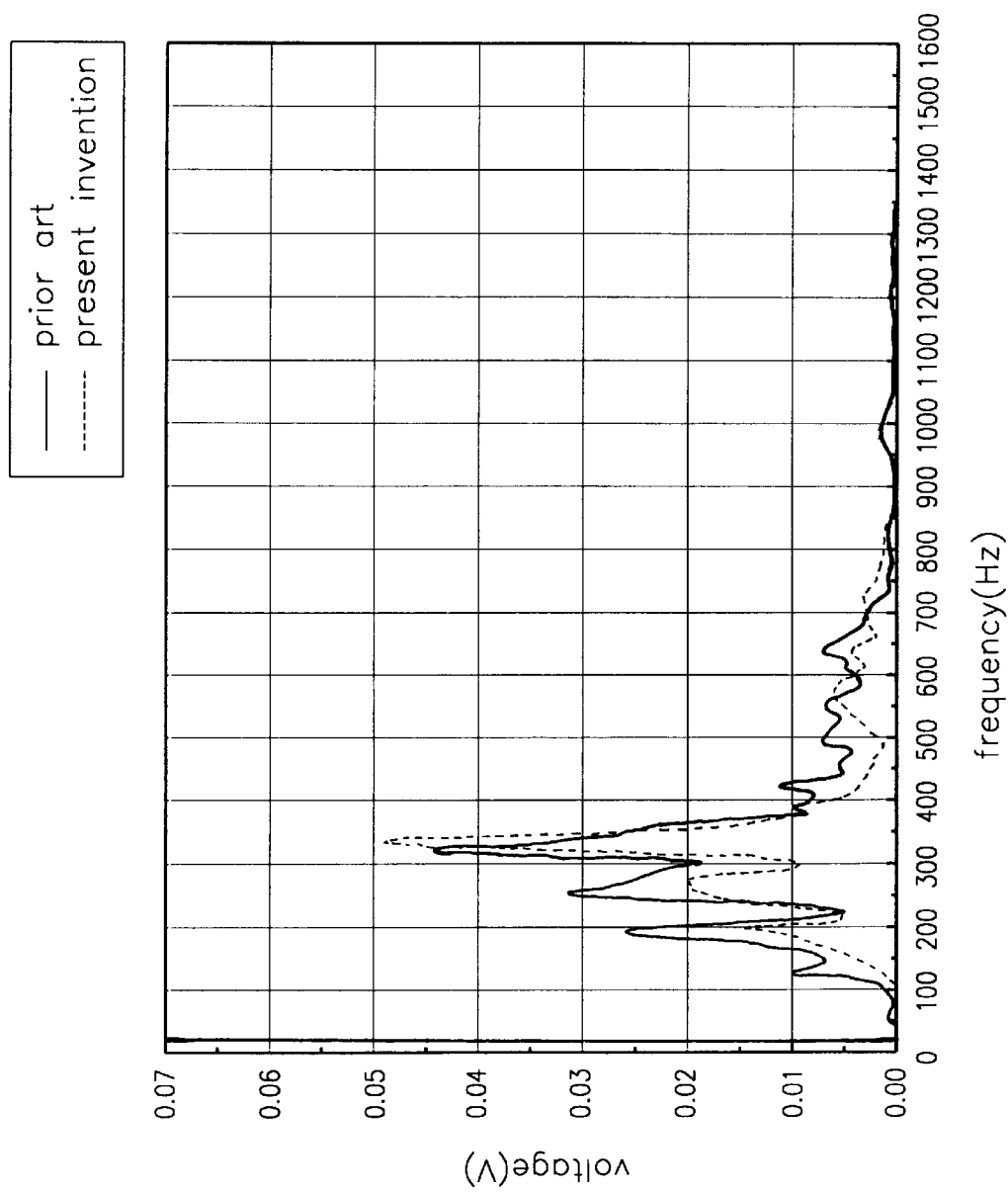
FIG. 17A offers a graph of accelerations in the direction of X axis measured at a reinforced left rail formed on the housing front portion in accordance with the third preferred embodiment of the present invention.
Figure 17B:
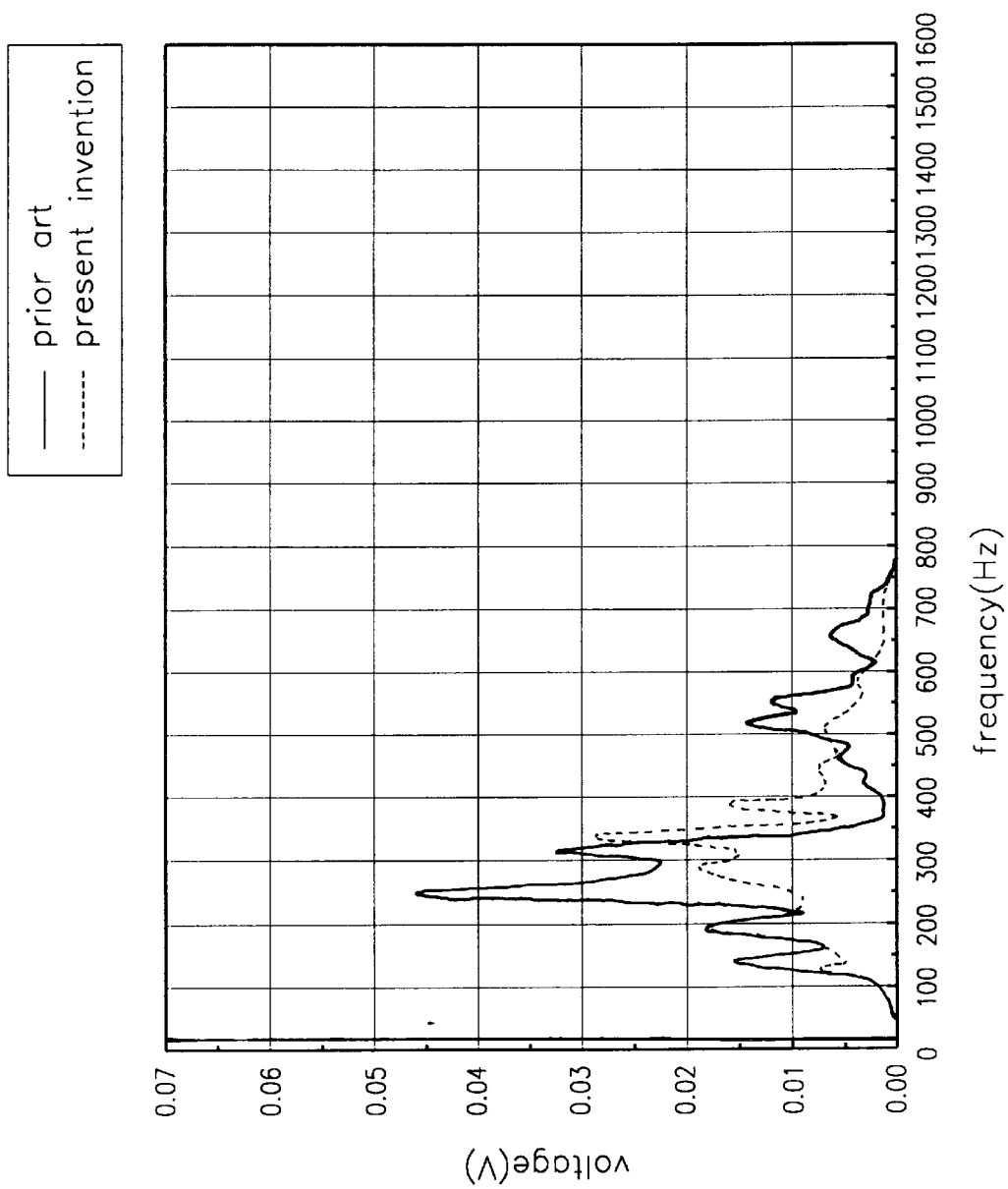
FIG. 17B presents a graph of accelerations in the direction of Y axis measured at the reinforced left rail formed on the housing front portion in accordance with the third preferred embodiment of the present invention.
Figure 17C:
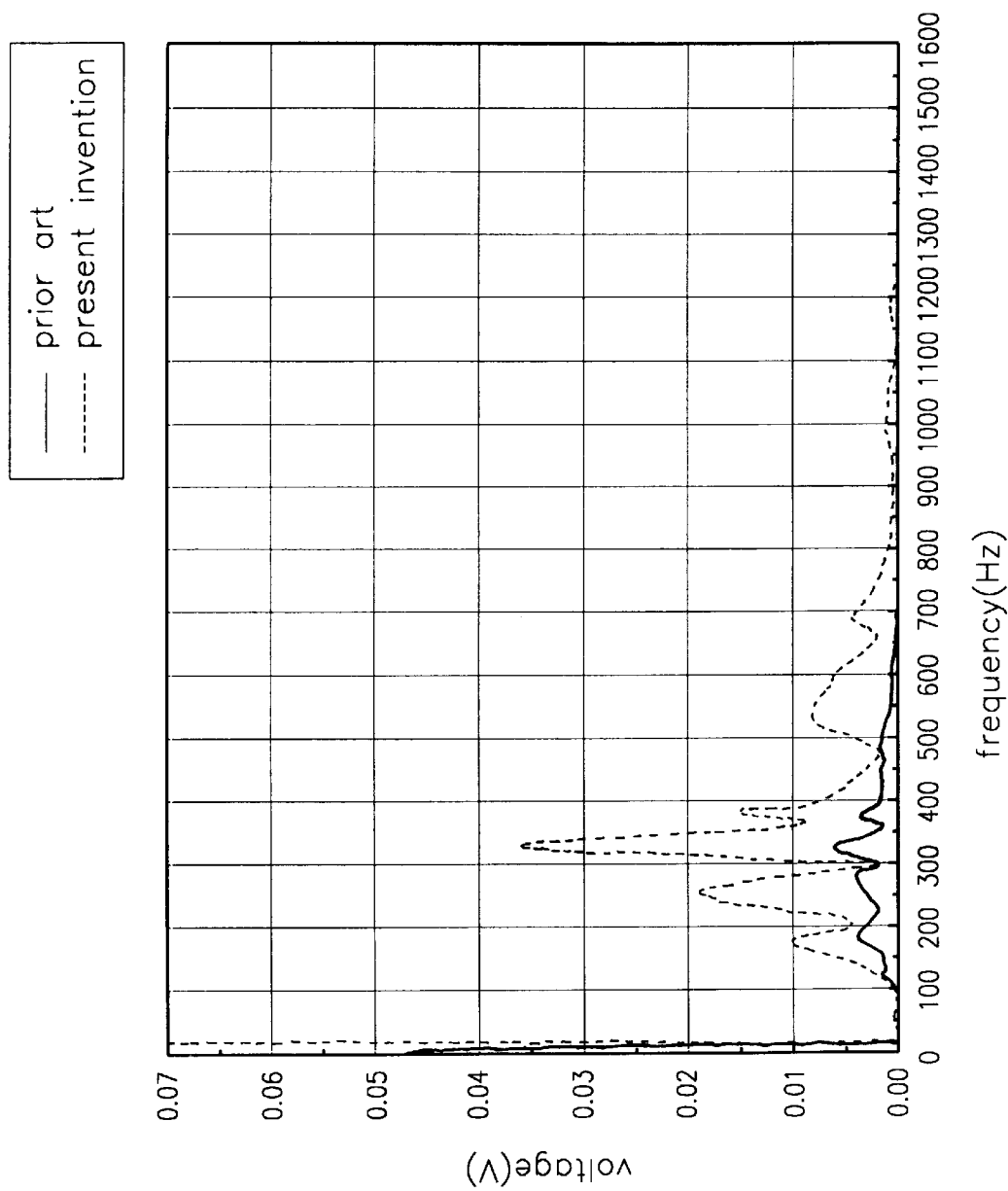
FIG. 17C is a graph of accelerations in the direction of Z axis measured at the reinforced left rail formed on the housing front portion in accordance with the third preferred embodiment of the present invention.
Figure 18A:
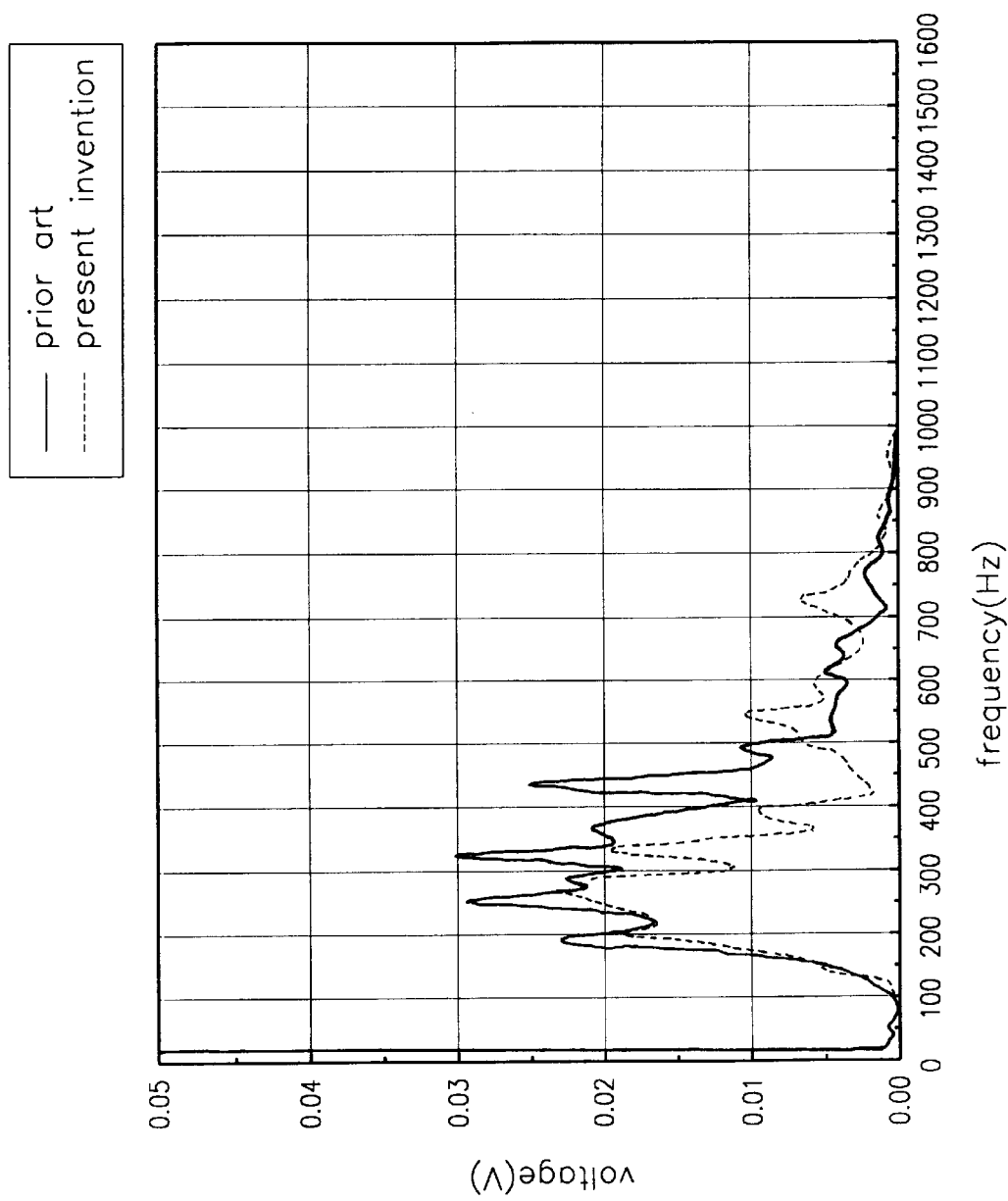
FIG. 18A offers a graph of accelerations in the direction of X axis measured at a reinforced right rail formed on the housing front portion in accordance with the third preferred embodiment of the present invention.
Figure 18B:
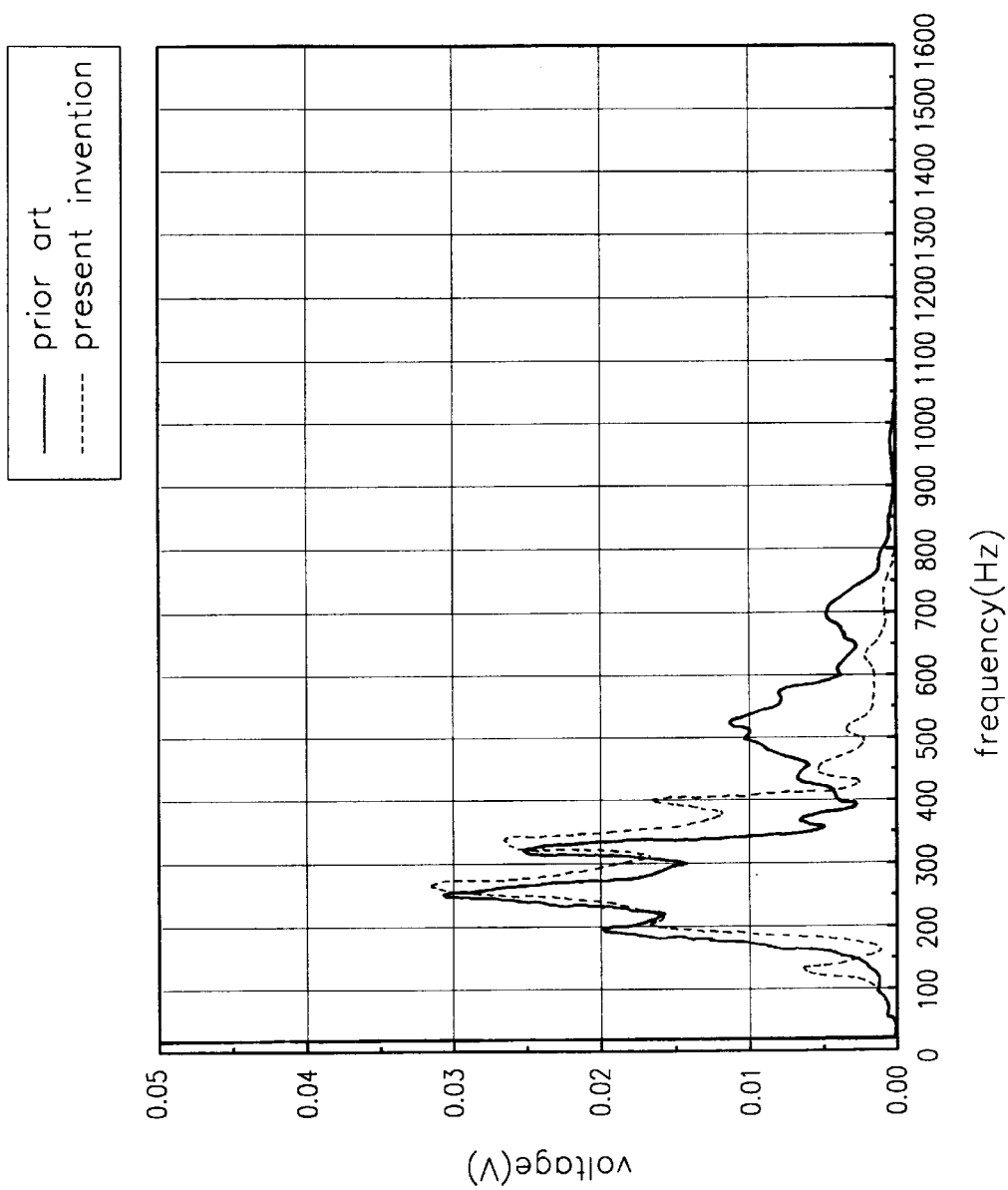
FIG. 18B presents a graph of accelerations in the direction of Y axis measured at the reinforced right rail formed on the housing front portion in accordance with the third preferred embodiment of the present invention.
Figure 18C:
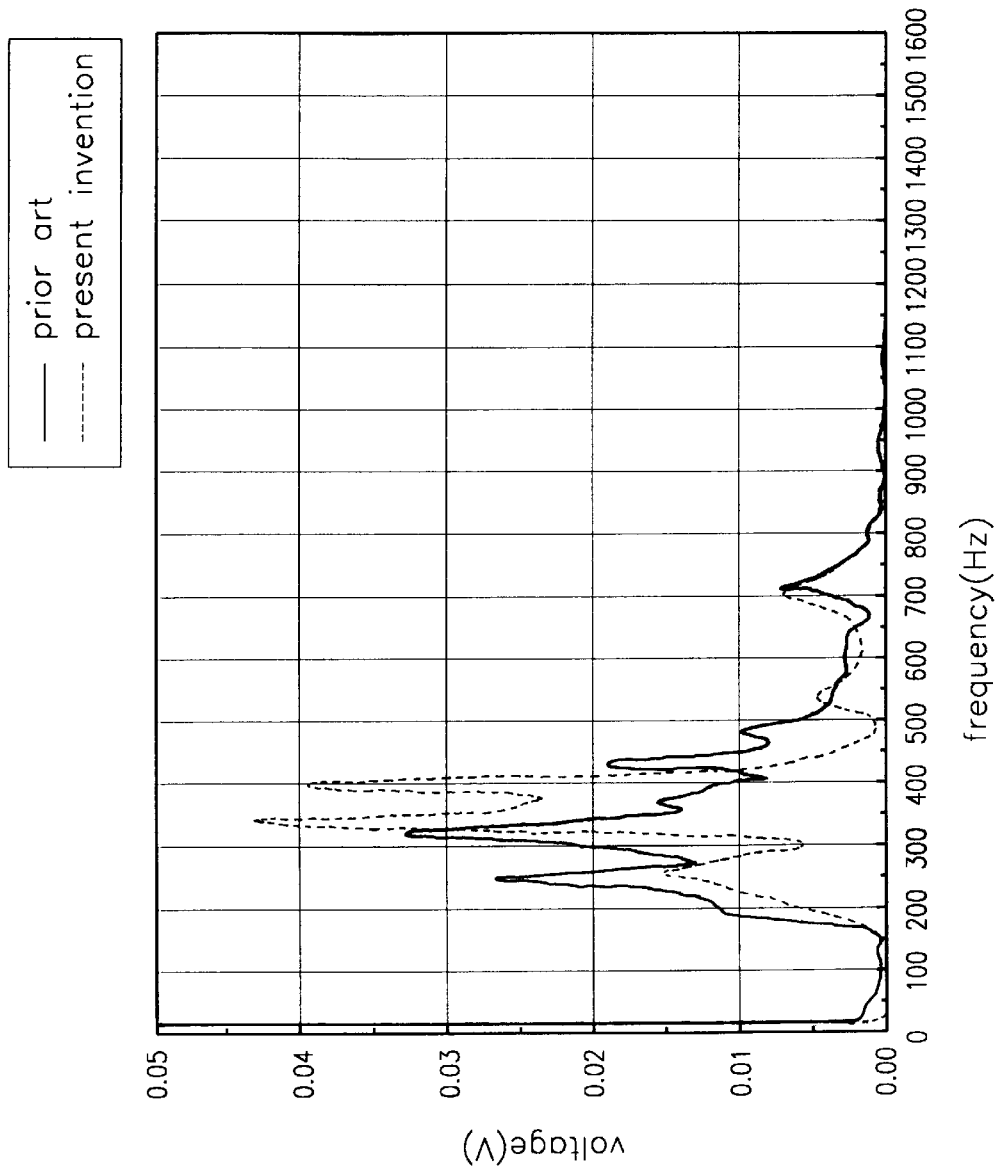
FIG. 18C is a graph of accelerations in the direction of Z axis measured at the reinforced right rail formed on the housing front portion in accordance with the third preferred embodiment of the present invention.

FIG. 17A offers a graph of accelerations in the direction of X axis measured at a reinforced left rail formed on the housing front portion in accordance with the third preferred embodiment of the present invention, FIG. 17B presents a graph of accelerations in the direction of Y axis measured at the reinforced left rail formed on the housing front portion in accordance with the third preferred embodiment of the present invention, FIG. 17C is a graph of accelerations in the direction of Z axis measured at the reinforced left rail formed on the housing front portion in accordance with the third preferred embodiment of the present invention, FIG. 18A offers a graph of accelerations in the direction of X axis measured at a reinforced right rail formed on the housing front portion in accordance with the third preferred embodiment of the present invention, FIG. 18B presents a graph of accelerations in the direction of Y axis measured at the reinforced right rail formed on the housing front portion in accordance with the third preferred embodiment of the present invention, and FIG. 18C is a graph of accelerations in the direction of Z axis measured at the reinforced right rail formed on the housing front portion in accordance with the third preferred embodiment of the present invention. These graphs show that a vibration in the direction of X axis and Y axis is diminished on the rails 14 mounted reinforcing supports 38 having ribs 37. Particularly, the vibration of the housing front portion due to the speaker is strikingly diminished.

According to the preferred embodiments of the present invention, a quality of a television can be improved through ascending the stiffness of a housing front portion, diminishing noises and vibrations by controlling a natural frequency and a mode of vibration of the television.

Although the invention has been shown and described with respect to the preferred embodiment, it will be understood by those skilled in the art that various changes and modifications may be made without departing from the spirit and scope of the invention as defined in the following claims.

What is claimed is:

1. A television having a housing front portion, a first segment of the housing front portion having a predetermined thickness, with a speaker thereon, said television comprising;

a vibration preventing device having a vibration preventing structure integrally formed on the housing front portion for diminishing vibration of the television caused by the speaker by controlling a natural frequency of the housing front portion and reinforcing the housing front portion, the vibration preventing structure including:

a bottom panel of the housing front portion and a face located in front of the bottom panel;

a reinforcing rib protruded beneath the bottom panel;

a reinforcing part formed under a rail of the housing front portion, the reinforcing part being used for contacting a surface on which the television sits; and reinforcing supports having ribs stretched long along the direction of the rails, to thereby diminish a vibration in a direction of X axis due to a sound pressure of the speaker.

2. The vibration preventing device according to claim 1, wherein the thickness of the bottom panel is 1.2 to 1.5 times the predetermined thickness.

3. The vibration preventing device according to claim 1, wherein the thickness of the reinforcing rib is 1.1. to 1.2 times the predetermined thickness.

4. The vibration preventing device according to claim 1, wherein the thickness of the reinforcing support is 1.3 to 1.5 times the predetermined thickness.

5. A housing front portion for accommodating a television with a speaker, comprising:

a vibration preventing device having a vibration preventing structure integrally formed on the housing front portion for diminishing vibration of the television caused by the speaker by controlling a natural frequency of the housing front portion and reinforcing the housing front portion, the vibration preventing structure including:

a bottom panel of the housing front portion and a face located in front of the bottom panel;

a reinforcing rib protruded beneath the bottom panel;

a reinforcing part formed under a rail of the housing front portion, the reinforcing part being used for contacting a surface on which the television sits; and reinforcing supports having ribs stretched long along the direction of the rails, to thereby diminish a vibration in a direction of X axis due to a sound pressure of the speaker.

6. The vibration preventing device according to claim 5, wherein the thickness of the bottom panel is 1.2 to 1.5 times the thickness of a first segment of the housing front portion.

7. The vibration preventing device according to claim 5, wherein the thickness of the reinforcing rib is 1.1. to 1.2 times the thickness of a first segment of the housing front portion.

8. The vibration preventing device according to claim 5 wherein the thickness of the reinforcing support is 1.3 to 1.5 times the thickness of a first segment of the housing front portion.

\* \* \* \* \*